3,376,301
METHOD OF PRODUCING TRIALLYLIC
ISOCYANURATES
William C. Francis and Donald L. Burdick, Overland Park, Kans., assignors, by mesne assignments, to Gulf Oil Corporation, Pittsburgh, Pa., a corporation of Pennsylvania
No Drawing. Continuation-in-part of application Ser. No. 51,507, Aug. 24, 1960. This application Jan. 20, 1964, Ser. No. 338,576
2 Claims. (Cl. 260—248)

This invention relates to the production of triallylic isocyanurates and more specificaly relates to an improved method for producing triallylic isocyanurates from cyanuric acid and an allylic halide. This application is a continuation-in-part of copending U.S. application Ser. No. 51,507 which was filed Aug. 24, 1960, now abandoned.

The term triallylic isocyanurates as used herein is meant to include the triallylic derivatives of cyanuric acid having the formula

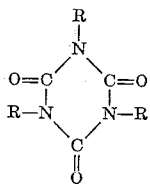

in which R is an allylic radical huch as allyl and the substituted allyl radicals, as for example, methallyl, 2-butenyl, 2-pentenyl and 3-phenyl-2-propenyl.

Triallylic isocyanurates, and particularly triallyl isocyanurate and trimethallyl isocyanurate, are useful as monomers for the preparation of polymeric resins since they readily homopolymerize as well as copolymerize with other unsaturated compounds to form useful resins. Triallyl isocyanurate has also been reported to have insecticidal properties.

Triallyl isocyanurate has been reported to be isolated from the reaction of allyl chloride with potassium isocyanate as well as prepared by the reaction of allyl chloride with cyanuric acid in aqueous sodium hydroxide and preferably in the presence of a surface active agent. However, the reaction in aqueous caustic solution suffers many disadvantages due to undesirable side reactions which lead to reduced yields of the desired product and impure products contaminated with unwanted by-products. For example, the aqueous caustic medium hydrolyzes triallyl isocyanurate to diallyl urea, and as well, hydrolyzes the allyl halide to allyl alcohol. In addition, the aqueous caustic reaction medium presents further problems in the isolation of the desired product.

The problems associated with synthesis of triallylic isocyanurates in aqueous alkaline systems have been attacked in various ways. Catalysts have been suggested which would make the reaction more selective. It has also been sought to circumvent the problem by use of a non-aqueous solvent. Use of alcohols does not suppress side reactions, however, and other solvents have failed to dissolve the reactants sufficiently so as to obtain the intimate contact necessary for a rapid reaction rate. When a non-aqueous solvent is employed for reaction of cyanuric acid with an allylic halide, the ordinary cheap acid acceptors such as sodium hydroxide are not desirable, since they produce water as a reaction by-product. The produced water then enters into side reactions, reducing the yield of desired product. Even when the more expensive organic bases are used as hydrogen halide acceptors, it has been found that under the best of circumstances the yields have not approached 90 percent. The disappointing results may be at least partially attributable to the presence of the basic hydrogen halide acceptor, or to some effect produced by interaction of the organic solvent with the basic substance. Assuming yields can be improved, the use of organic bases is desirable from the standpoint of eliminating water and assisting in dissolving the cyanuric acid. However, the increased expense involved in purchase and recovery of the organic base renders the method economically unfeasible.

This invention provides an improved method for producing triallylic isocyanurates by the reaction of a salt of cyanuric acid with an allylic halide in the presence of an N,N-di-lower alkylformamide reaction medium under substantially anhydrous, neutral conditions. Particularly useful lower alkyl substituents are those having 1 to about 5 carbon atoms, such as methyl, ethyl, propyl, butyl and pentyl. Especially useful N,N-di-lower alkylformamides are N,N-dimethylformamide and N,N-diethylformamide, due to their ready availability and economy. Although the preferred cyanurate salts are essentially insoluble in the di-lower alkyl formamides, these compounds, surprisingly, are excellent reaction media for the preparation of triallylic isocyanurates. This is apparently due in part to increasing solubility of intermediate reaction products and relative insolubility of the halide salt by-products formed in the process.

The amount of N,N-di-lower alkylformamide employed may be varied considerably, but it should be sufficient to dissolve the allylic halide and maintain intimate contact with the dry cyanuric acid salt, as well as provide efficient heat transfer throughout the reaction mixture. Generally about 2 to 10 parts by weight of N,N-di-lower alkylformamide are employed for each part by weight of cyanuric acid salt. Although greater amounts of substituted formamide may be used, they are unnecessary and would be uneconomical.

The reaction of the cyanuric acid salt with the allylic halide is effected at a temperature in the range of about 60° to about 150° C. and preferably at about 70° to about 125° C. In many cases, the reaction mixture can be maintained at reflux temperature, thereby providing convenient and efficient control of the reaction temperature. At such temperatures the reaction is essentially complete in a short time, about 3 to 10 hours ordinarily being sufficient. Of course, shorter or longer reaction periods may be used and the conversions will be dependent at least in part upon the reaction temperature employed. Such modifications are obvious to those skilled in the art and may be readily determined.

Allylic halides such as the allylic bromides, chlorides and iodides may be employed in the reaction. The allylic bromides and chlorides, for example, allyl chloride, allyl bromide, methallyl chloride, methallyl bromide, 1-bromo-2-butene and 1-chloro-2-pentene are especialy useful. Generally at least 3 moles of allylic halide, and preferably about 3 to about 6 moles of allylic halides, are used with each mole of cyanuric acid salt in the reaction. Less than 3 moles of allylic halide can be used and will produce the triallylic isocyanurate, since it is characteristic of the process that production of mono- and dialylic isocyanurates is minimized, even when reaction is incomplete.

When the reaction is completed, the halide salt and any unreacted salt of cyanuric acid are removed, generally by filtration, and the N-substituted formamide then is removed by distillation, preferably under slightly reduced pressure, to give the crude triallylic isocyanurate as a residue. In the case of crystalline isocyanurates, the crude product is purified by crystallization from suitable solvents such as methanol, ethanol or diethyl ether. Other isocyanurates, such as triallyl isocyanurate, can be purified by distillation under reduced pressure. The unreacted salt of cyanuric acid can be recovered after limited washing with water to remove the major portion of the halide salt and then may be dried and recycled for preparation of additional triallylic isocyanurate. Alternatively, the mixture of salts is acidified in an aqueous medium and the precipitated cyanuric acid is removed by filtration. The recovered N-substituted formamide is also conveniently recycled in the process.

In a preferred embodiment of this invention, the trialkali metal salt of cyanuric acid is previously prepared by reaction of about 3 equivalents of the corresponding alkali metal hydroxide with cyanuric acid. The dried salt is then mixed with the N,N-di-lower alkylformamide, the mixture is agitated and heated to about 100°–125° C., and then about 3 moles of allylic halide added. The resulting reaction mixture is maintained at reflux temperature for about 3 to 10 hours and then cooled to room temperature. The by-product alkali metal halide is removed by filtration, and the solvent removed by distillation under reduced pressure. The crude product residue is purified by conventional procedures, such as by distillation under reduced pressure or recrystallization from solvents such as methanol or diethyl ether.

The following examples are presented to illustrate specific embodiments of the invention but are not intended to limit the invention.

Example 1

Cyanuric acid was slurried with 3 mole equivalents of sodium hydroxide in an aqueous solution. The slurry was heated to boiling and then distilled to dryness under reduced pressure. The residual salt was dried overnight at 109° C. to give trisodium cyanurate as a crystalline salt.

A slurry of 390 grams (2 mole) of the trisodium cyanurate in 2 liters of N,N-dimethylformamide was stirred and heated to 110° C. Allyl chloride (1530 grams; 20 moles) was added to the stirred solution over a period of 4 hours. The reflux temperature of the mixture had dropped to about 72° C. when the addition was completed. Stirring was continued for 18 hours at reflux temperature of 72–76° C. and the reaction mixture was then distilled under reduced pressure to remove excess allyl chloride. The concentrate was cooled and filtered to remove sodium chloride and unreacted trisodium cyanurate, which was treated with dilute hydrochloric acid to give 24.6 grams (9.5% recovery) of cyanuric acid. The N,N-dimethylformamide solution was distilled under reduced pressure to remove the solvent and the residue was dissolved in an equal volume of diethyl ether. The ether solution was washed with 5% aqueous sodium hydroxide, dried over anhydrous sodium sulfate and the ether removed by distillation to give 441.4 grams (88.5% of theory) of triallyl isocyanurate, representing a 97.5% yield, based on recovered cyanuric acid.

Example 2

A slurry of previously prepared trisodium cyanurate (19.5 grams; 0.1 mole) in 100 ml. of N,N-diethylformamide was heated, with stirring, to 105° C. Allyl chloride (46.0 grams; 0.6 mole) was added to the heated solution over a 2 hour period and the reaction mixture then maintained at reflux temperature (90–95° C.) for 15 hours. The reaction mixture was cooled and filtered and the filtrate concentrated under reduced pressure to remove the excess allyl chloride and N-substituted formamide. The residue was dissolved in an equal volume of diethyl ether, the ether solution washed with a 50 ml. portion of 5% aqueous sodium hydroxide and then with 50 ml. of water. Evaporation of the ether extract yielded 12.4 grams of crude triallyl isocyanurate (50% conversion) which was crystallized from cold methanol to give the purified product. When various N,N-di-lower alkyl formamides are employed as solvents, variations in conversion rates are observed. However, the selectivity (and therefore, the ultimate yield) remain excellent.

Examples 3 to 7

In Examples 3 to 7 inclusive, trisodium cyanurate was reacted with allyl chloride in the presence of N,N-dimethylformamide as described in Example 1 except for various modifications. In Examples 3, 6, and 7, 100 ml. of N,N,-dimethylformamide were used. In Examples 4 and 5, 2 liters of N,N- dimethylformamide were used. Data concerning other modifications and the experimental results are presented in Table 1.

TABLE 1

| Ex. No. | Trisodium Cyanurate Added (g.) | Allyl Chloride Added | | Mole Ratio Cyanurate Salt/Allyl Chloride | Reaction Temp. (° C.)[1] | Total Reaction Time (hrs.) | Triallyl Isocyanurate | | | Recovered Cyanuric Acid (g.) |
|---|---|---|---|---|---|---|---|---|---|---|
| | | Amount (g.) | Time of Addition (hrs.) | | | | Yield (g.) | Conversion (percent) | Percent Yield [2] | |
| 3 | 19.5 | 76.5 | 2 | 1/10 | 105–69 | 23.5 | 22.5 | 91 | 97 | 0.9 |
| 4 | 390 | 780 | 5.5 | 1/5 | 110–93 | 22.5 | 387.8 | 78 | 84 | 19.0 |
| 5 | 390 | 918 | 5.5 | 1/6 | 110–95 | 7 | 433.4 | 88 | 96 | 21.7 |
| 6 | 19.5 | 30.6 | 2 | 1/4 | 110–95 | 8 | 21.1 | 85 | 92 | 1.0 |
| 7 | [3]17.3 | 16.8 | [4]0 | 1/2 | 100–105 | 7 | 14.7 | 59 | 82 | 3.6 |

[1] Two temperatures are given. The first refers to the temperature of the reaction slurry when the allyl chloride addition was started, and the second refers to reflux temperature at the end of the reaction.
[2] Percent yield is based on recovered cyanuric acid.
[3] Disodium cyanurate was used in Example 7 instead of trisodium cyanurate.
[4] Allyl chloride was present in the initial charge and the reaction mixture then heated to reflux.

Example 8

To a stirred slurry of 19.5 g. (0.1 mole) of trisodium cyanurate in 100 ml. of N,N-dimethylformamide was added 15.3 g. (0.2 mole) of allyl chloride at about 110° C. over a 45 minute period. The reaction mixture was then stirred and refluxed at 100–107° C. for 5 hours. The reaction mixture was cooled, filtered and the solvent removed from the filtrate by distillation under reduced pressure to give 11.5 g. of crude triallyl isocyanurate, representing a 46% conversion (97.5% yield based on recovered cyanuric acid).

Unreacted cyanuric acid (6.8 g.) was recovered by acidification of the dimethylformamide-insoluble precipitate.

Example 9

A slurry of trisodium cyanurate (19.5 g.; 0.1 mole) and 100 ml. of N,N-dimethylformamide was heated, with stirring, to 110° C. Methallyl chloride (54.3 g.; 0.6 mole) was then added over a 1¼ hour period. The reaction mixture was maintained at 110° C. for an additional 6 hours, and the slurry was then cooled and filtered to remove the insoluble precipitate. The filtrate was concentrated on a steam bath under reduced pressure to give 24.4 g. of crystalline residue. This residual solid was dissolved in 125 ml. of diethyl ether and the ether solution washed successively with 50 ml. portions of 5% aqueous sodium hydroxide, 1% aqueous hydrochloric acid and finally, with water. The ether extract was dried and then evaporated to dryness to give 20.4 g. of trimethallyl isocyanurate, M.P. 83–85° C. (70.2% conversion). Recrystallization from 65% aqueous ethanol gave the purified product, M.P. 84.5–85.5° C. with the following elemental analyses.

Calculated for $C_{15}H_{21}N_3O_3$: C, 62.1; H, 7.24; N, 14.47. Found: C, 62.1; H, 7.06; N, 14.28.

Various obvious changes and modifications of the invention can be made, and, to the extent that such variations incorporate the spirit of this invention, they are intended to be included within the scope of the appended claims.

We claim:
1. In the method of preparing a triallylic isocyanurate which comprises reacting an alkali metal salt of cyanuric acid with an allylic halide selected from the class consisting of allyl halides and substituted allyl halides having substituents which are essentially non-reactive with said alkali metal salt of cyanuric acid under isocyanurate-forming conditions, said reaction being carried out at a temperature in the range of about 60° to 150° C., the improvement of carrying out the reaction in an N,N-dilower alkyl formamide reaction medium under substantially anhydrous conditions.

2. In the method of preparing triallyl isocyanurate which comprises reacting an alkali metal salt of cyanuric acid with allyl halide at a temperature in the range of about 60°–150° C., the improvements of reacting trisodium cyanurate with at least 3 moles of allyl chloride per mole of trisodium cyanurate in a N,N-dimethyl formamide reaction medium under substantially anhydrous conditions.

References Cited
UNITED STATES PATENTS

| | | | |
|---|---|---|---|
| 2,866,801 | 12/1958 | Himel et al. | 260—248 X |
| 2,894,950 | 7/1959 | Lloyd et al. | 260—248 |
| 2,905,671 | 9/1959 | Christian et al. | 260—248 |
| 3,075,979 | 1/1963 | Tazuma et al. | 260—248 |

JOHN D. RANDOLPH, *Primary Examiner.*

WALTER A. MODANCE, *Examiner.*

J. M. FORD, *Assistant Examiner.*